(12) United States Patent
Bajko et al.

(10) Patent No.: US 9,071,966 B2
(45) Date of Patent: Jun. 30, 2015

(54) METHODS AND APPARATUS FOR WIRELESS NETWORKING CONNECTION

(71) Applicant: Nokia Corporation, Espoo (FI)

(72) Inventors: Gabor Bajko, Sunnyvale, CA (US); Jarkko Kneckt, Espoo (FI); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/672,869

(22) Filed: Nov. 9, 2012

(65) Prior Publication Data

US 2013/0115918 A1 May 9, 2013

Related U.S. Application Data (60) Provisional application No. 61/557,526, filed on Nov. 9, 2011.

(51) Int. Cl.
*H04W 12/06* (2009.01)
*H04W 12/08* (2009.01)

(52) U.S. Cl.
CPC .............. *H04W 12/06* (2013.01); *H04W 12/08* (2013.01)

(58) Field of Classification Search
CPC ..... H04W 48/16; H04W 48/08; H04W 8/005; H04W 12/06; H04W 12/08; H04W 72/04; H04W 24/00; H04W 84/04; H04W 84/12; H04W 84/18; H04W 84/22; H04W 88/08; H04W 88/12; H04W 12/2856; H04W 63/0209; H04W 63/101; H04W 63/162; H04L 29/06

USPC .......... 455/432.1–434, 435.1–442, 410–411, 455/435, 1; 370/331–338, 349, 230.1, 328, 370/389; 713/201
See application file for complete search history.

(56) References Cited

U.S. PATENT DOCUMENTS

| | | | |
|---|---|---|---|
| 8,116,735 B2 * | 2/2012 | Liu et al. ........................ | 455/411 |
| 2004/0078598 A1 * | 4/2004 | Barber et al. ................. | 713/201 |
| 2005/0073979 A1 * | 4/2005 | Barber et al. ................. | 370/338 |

(Continued)

FOREIGN PATENT DOCUMENTS

WO  WO-03/093951 A2  11/2003
WO  WO-2006/119281 A2  11/2006

OTHER PUBLICATIONS

IEEE Std 802.11u™-2011; "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 9: Interworking with External Networks"; Feb. 25, 2011; whole document (208 pages); IEEE Computer Society, New York, NY, USA.

(Continued)

*Primary Examiner* — Nizar Sivji
(74) *Attorney, Agent, or Firm* — Harrington & Smith (57) ABSTRACT

Systems and techniques for wireless client authentication are described. A wireless client seeking access to a network requiring authentication transmits a management frame following a signaling sequence that accomplishes scanning, network discovery, and authentication. An access point receiving the management frame forwards information contained in the management frame to a network and receives and forwards to a client an authentication response frame received from a network.

10 Claims, 4 Drawing Sheets

(56) References Cited

U.S. PATENT DOCUMENTS

| | | | |
|---|---|---|---|
| 2005/0250498 A1* | 11/2005 | Lim et al. | 455/436 |
| 2006/0239208 A1 | 10/2006 | Roberts et al. | 370/254 |
| 2008/0205385 A1* | 8/2008 | Zeng et al. | 370/389 |
| 2010/0184407 A1* | 7/2010 | Tachikawa | 455/411 |
| 2011/0075589 A1* | 3/2011 | Bradley et al. | 370/254 |
| 2011/0211566 A1* | 9/2011 | Jing et al. | 370/338 |
| 2012/0165056 A1* | 6/2012 | Kim et al. | 455/509 |
| 2013/0336113 A1* | 12/2013 | Okuyama | 370/230.1 |
| 2014/0112249 A1* | 4/2014 | Cho et al. | 370/328 |
| 2014/0153463 A1* | 6/2014 | Park et al. | 370/311 |

OTHER PUBLICATIONS

IEEE Std 802.11™-2007; "IEEE Standard for Information technology—Telecommunications and information exchange between systems—Local and metropolitan area networks—Specific requirements; Part 11: Wireless LAN Medium Access Control (MAC) and Physical Layer (PHY) Specifications "; Jun. 12, 2007; whole document (1232 pages); IEEE Computer Society, New York, NY, USA.

* cited by examiner

METHODS AND APPARATUS FOR WIRELESS NETWORKING CONNECTION

CROSS-REFERENCE TO RELATED APPLICATIONS

This patent application claims priority under 35 U.S.C. §119(e) from Provisional Patent Application No. 61/557,526 filed Nov. 9, 2011, the disclosure of each of which is incorporated by reference herein in its entirety.

FIELD OF THE INVENTION

The present invention relates generally to wireless networking. More particularly, the invention relates to improved systems and techniques for wireless network connection and authentication.

BACKGROUND

The following abbreviations that may be found in the specification and/or the drawing figures are defined as follows:
AAA authentication, authorization, and accounting
AP access point
BSS basic service set
BSSID basic service set identifier
EAP extensible authentication protocol
EAPOL extensible authentication protocol over LANs
ESS extended service set
FCS frame check sequence
GAS generic advertisement service
LAN local area network
MAC/PHY media access control/physical
RTT round trip time
SSPN subscription service provider network
STA station Wireless networking using the 802.11 protocol, commonly referred to as Wi-Fi, is widely used, with many entities such as governments, businesses, transit services, libraries, airports, museums, and airlines providing wireless networking access either free of charge or for a fee. The wider availability of data services through subscription networks, such as 3G and 4G networks, has not reduced the demand for 802.11 protocol services. Indeed, the proliferation of 3G and 4G networks has increased the number of devices that are capable of using 802.11 services, because devices using 3G and 4G networks provide data capability and it is a simple matter to design such devices so that they can also take advantage of 802.11 services. Such devices are typically small and easily carried everywhere. In addition, many larger, but still small, devices are now available, and many such devices typically employ 802.11 services and do not use 3G or 4G services. Both small devices such as wireless telephones and similar devices, and larger devices, such as tablets or readers, may be carried everywhere by a user—to restaurants, to cafés, on buses, on the street, to airports, on airplanes, and at many other locations. A user of a 3G/4G device might choose to use available 802.11 services for any of a number of reasons. For example, the user might be receiving a poor signal or might be traveling outside of his or her home network. Selecting 802.11 services might provide the user with a connection that is fast, reliable, and inexpensive or even free of charge.

Many small devices have limited battery power, and many such devices may be used under circumstances in which it is difficult to charge the device. For example, if a device is used on a bus or an airplane, the user may well need to depend on the battery charge that was present when the user boarded the vehicle, without an opportunity to recharge possibly for hours.

The proliferation of small devices has increased the use of data communication while users are moving from one location to another. One significant factor that reduces the usefulness of data devices under such circumstances is the time required for connection of a client to an access point. Faster connections reduce power consumption and make it easier for users to continue their activities when moving between areas served by different access points.

SUMMARY OF THE INVENTION

In one embodiment of the invention, an apparatus comprises at least one processor and memory storing a program of instructions. The memory storing the program of instructions is configured to, with the at least one processor, cause the apparatus to at least transmit a management frame comprising information needed for scanning, network discovery, and authentication and respond to an authentication response frame sent by the network in response to the management frame by following authentication procedures of the network.

In another embodiment of the invention, an apparatus comprises at least one processor and memory storing a program of instructions. The memory storing the program of instructions is configured to, with the at least one processor, cause the apparatus to at least detect receiving from a client a management frame comprising information needed for scanning, network discovery and authentication, and respond to receiving the management frame by forwarding information contained in the management frame to a network.

In another embodiment of the invention, a method comprises transmitting a management frame comprising information needed for scanning, network discovery, and authentication and responding to an authentication response frame sent by a network in response to the management frame by following authentication procedures of the network.

In another embodiment of the invention, a method comprises detecting receiving from a client a management frame comprising information needed for scanning, network discovery and authentication, and responding to receiving the management frame by forwarding information contained in the management frame to a network.

In another embodiment of the invention, a computer readable medium stores a program of instructions, execution of which by a processor configures an apparatus to at least cause the apparatus to at least transmit a management frame comprising information needed for scanning, network discovery, and authentication and respond to an authentication response frame sent by a network in response to the management frame by following authentication procedures of the network.

In another embodiment of the invention, a computer readable medium stores a program of instructions, execution of which by a processor configures an apparatus to at least detect receiving from a client a management frame comprising information needed for scanning, network discovery and authentication, and respond to receiving the management frame by forwarding information contained in the management frame to a network.

DETAILED DESCRIPTION

Various embodiments of the present invention recognize that connection and authentication may present significant obstacles to efficient use of 802.11 services, especially when, as now, many users frequently move between access points, a new connection is required every time a transition is made. Many access points serve as entryways into external networks requiring authentication of users before services will be provided, or may provide different levels of services to different classes of users. Such networks may require subscriptions, or may simply require that users meet particular conditions before services will be provided. For example, a user may be required to accept a service agreement, or the user may be required to provide identification information. In any case in which user authentication is desired, convenient connection to an 802.11 access point, and authentication of the user to a network to which the access point provides access, will provide significant benefits and efficiencies to users.

The interaction between 802.11 access points and clients, and external networks, is defined by the IEEE Std. 802.11™-2007, and its various amendments, particularly amendment 9, also referred to as IEEE Std. 802.11™-2011. The 802.11u amendments define interworking with external networks. According to this standard as presently defined, a client must perform scanning, followed by network discovery procedures, and then begin an authentication procedure, comprising an extensible authentication protocol over LANs (EAPOL) message exchange. Various approaches may be taken to various elements of these procedures. For example, passive scanning may be performed, in which the client listens to media. Such an approach may require significant time such as over 100 ms, particularly if the channel being scanned is idle. On the other hand, a channel for communication with an 802.11 access point may be serving a substantial number of devices, so that active scanning would add substantial additional signaling and might well overload what will frequently be a small network.

After scanning, when a device seeking access to its home network or another network that has discovered the access point with which it may most suitably associate, it must perform a network discovery procedure, frequently using generic advertisement service (GAS) action frames, defined in the 802.11u amendment to the 802.11 standard. An EAPOL-start message must then be sent to initiate authentication.

Scanning takes time passive scanning requires typically on the order of 100 ms, and active scanning takes at least one round trip time on the order of 5 ms. GAS exchange also requires at least one round trip time (RTT), and EAPOL-Start+EAP-Req-Identity requires another round trip time. Thus, sending EAP-Response-Identity must be preceded with at least either T+2*RTT or 3*RTT message exchanges under current procedures.

Embodiments of the present invention therefore provide systems and techniques for combining scanning, network discovery, and authentication into a single step, thus reducing the complexity of, and time required for, connecting to a network.

Figure 1:
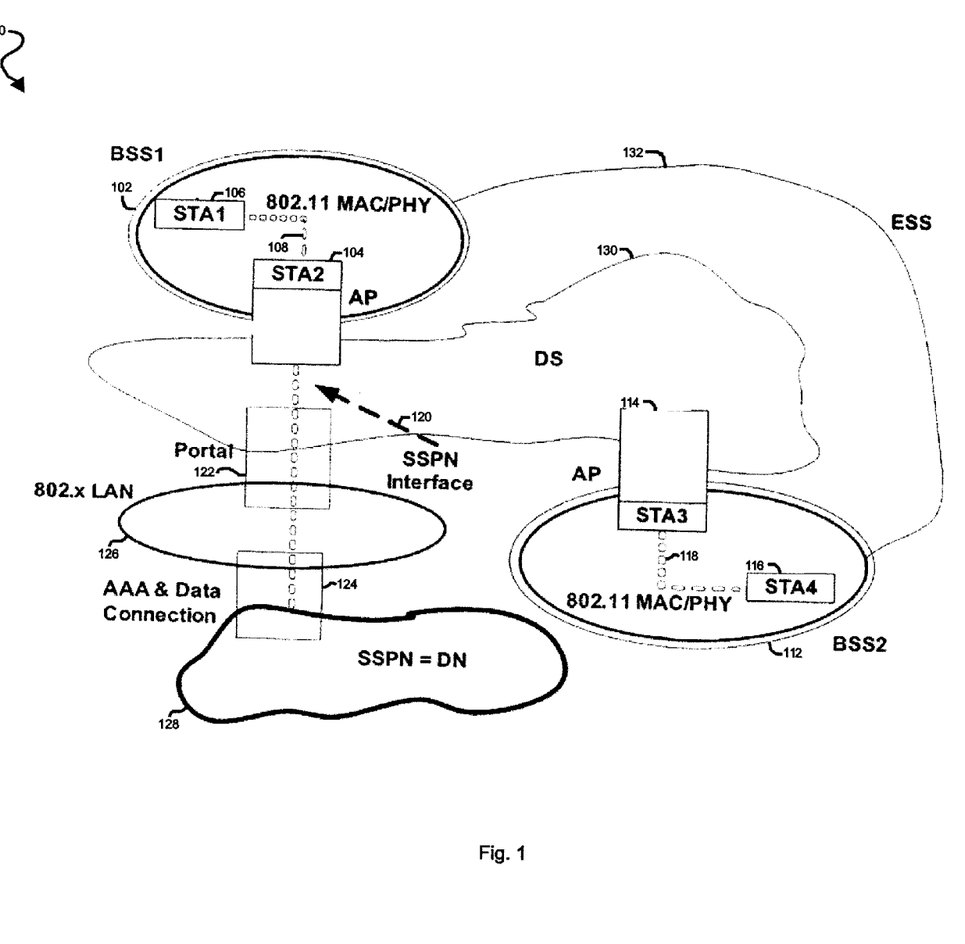
FIG. 1 illustrates a wireless network access point and other elements providing network access to clients according to an embodiment of the present invention.

FIG. 1 illustrates a system 100 according to an embodiment of the present invention. The network 100 comprises a first basic service set (BSS) 102, which may comprise an access point (AP) 102, identified here as the STA2, and a client 106, identified here as STA1. The AP 102 and the client 104 suitably communicate over a media access control/physical (MAC/PHY) interface) 108. The network 100 further comprises a second basic service set (BSS) 112, which may comprise an AP 114, identified here as STA3, and a client 116, identified here as STA4. The AP 114 and the client 116 suitably communicate over a media access control/physical (MAC/PHY) interface) 118. The basic service sets may comprise an extended service set (ESS).

The system 100 further provides access to a subscription service provider network (SSPN) 119, to which the APs 104 and 114 gain access through an SSPN interface 120. The SSPN interface provides access to a portal 122, which in turn provides access to an AAA server 124, suitably through a local area network 126. The AAA server 124 represents the subscription service provider network 126 to devices that gain access to it through the server 124.

Figure 2:
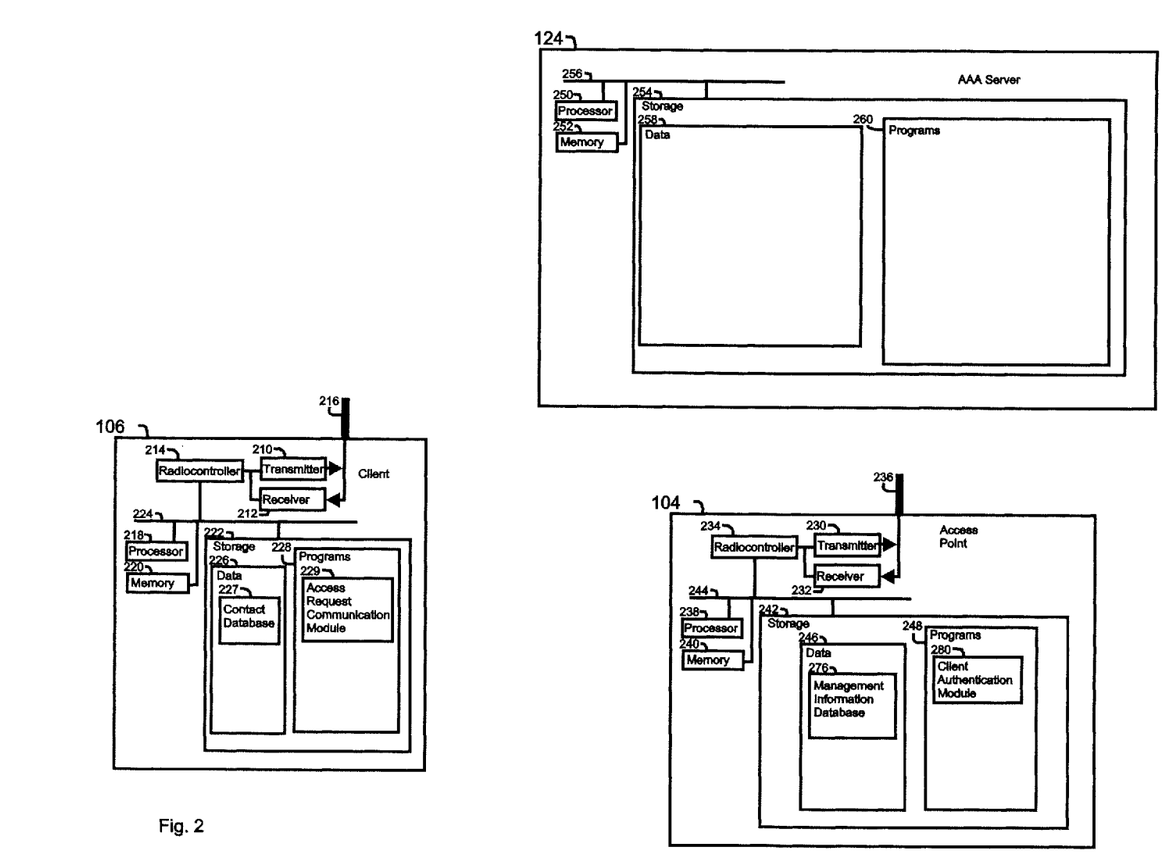
FIG. 2 illustrates details of various elements belonging to or served by a wireless network according to an embodiment of the present invention.

FIG. 2 illustrates additional details of an exemplary access point and client station, in the present exemplary case the AP 104 and the client 106. The client 106 may take any number of forms, and may be, for example, a notebook computer, a tower computer, a wireless telephone, a tablet, or any other device capable of connecting to an access point using the 802.11 protocol. The client 106 may suitably comprise a transmitter 210, receiver 212, radiocontroller 214, and antenna 216. The client 104 may also include a processor 218, memory 220, and storage 222, communicating with one another and with the radiocontroller 214 over a bus 224. The client 106 may employ data 226 and programs 228, residing in storage 222, with the data comprising a contact database 227 and the programs comprising an access request communication module 229.

The AP 104 may be similarly configured, comprising a transmitter 230, receiver 232, radiocontroller 234, and antenna 236. The AP 104 may also comprise a processor 238, memory 240, and storage 242, communicating with one another and with the radiocontroller 234 over a bus 244. The AP 104 may employ data 246 and programs 248, residing in storage 242. The programs 248 may include, for example, a client authentication module 280, which manages access requests from a client seeking to communicate with the AP 104 and obtain access to a home network or other available network through the AP 104.

The server 124 may comprise a processor 250, memory 252, and storage 254, communicating with one another over a bus 256. The server 124 may employ data 258 and storage 260, residing in storage 254.

The AP 104 and server 124 may interact through the subscription service provider network interface 120, which allows for authenticating users and provisioning services. The exchange of authentication and provisioning information between the SSPN and the AP passes transparently through the portal 122. The logical SSPN interface 120 allows the AP 104 to consult the SSPN 119 for authenticating and authorizing a specific non-AP STA such as the STA 106 and to report statistics and status information to the SSPN 119. Authentication and provisioning information for non-AP STAs received from the SSPN are stored in a management information database 276 of the AP 104, suitably as part of the data 246.

The AP 104, STA 104, and server 124 may suitably employ components and features for implementing the 802.11 standard, including the 802.11u standard. In addition, these and other devices designed according to embodiments of the present invention may employ features representing modifications of or deviations from the standard and its present amendments, in order to provide for more efficient connection. The 802.11 standard defines what are referred to as subtype management frames, allocating fields of information that may be communicated between devices such as the STA 104 and the AP 102. A number of frames are defined, with each frame providing definitions of information to be transferred by the frame.

Embodiments of the present invention employ a number of management frames to define appropriate information and signaling. In particular, embodiments of the invention define a management frame subtype that may conveniently be referred to as a conditional authentication management frame. This management frame subtype defines a signaling sequence that accomplishes scanning, network discovery, and authentication. The management frame subtype may suitably comprise a request for authentication, or a request for network services that may require authentication.

The access request communication module 229 of the client 106 manages the assembly and communication of identifying information from the client 229 to authenticating or serving entities. The access request communication module 229 may suitably include probe request information, generic advertising service information, and EAP-Response Identity EAPoL information. This information can all be communicated in a single management frame.

Figure 3:
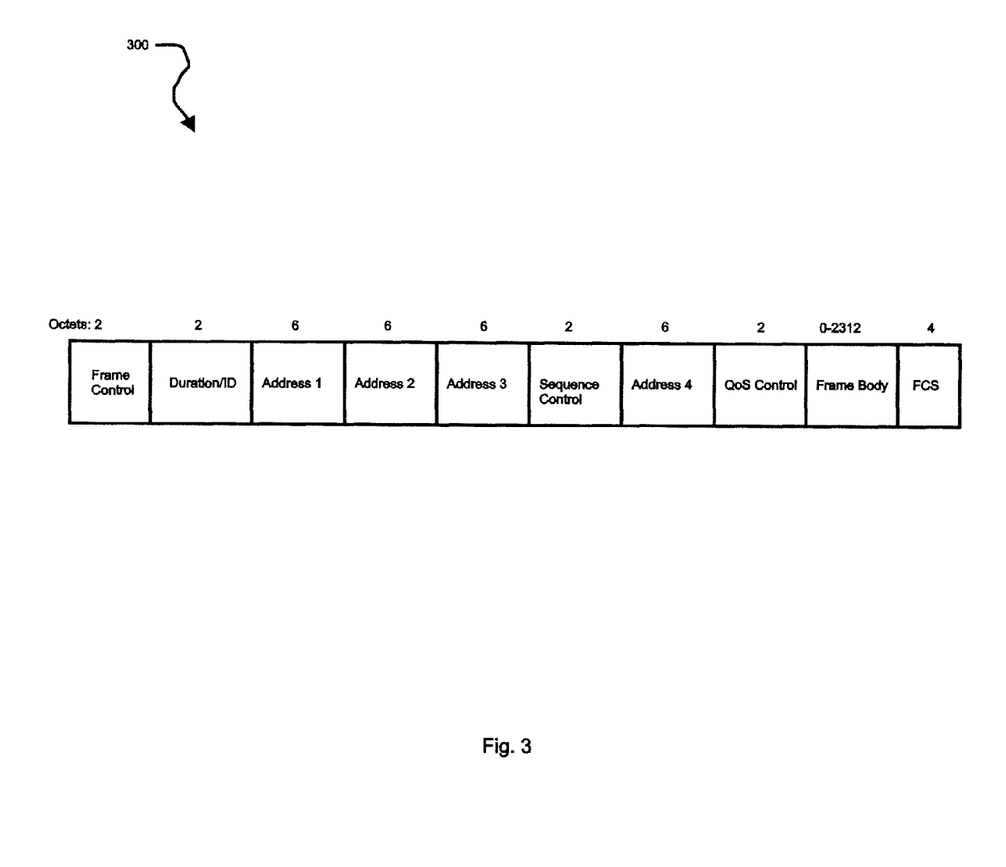
FIG. 3 illustrates exemplary signaling between a wireless network and access points according to an embodiment of the present invention.

FIG. 3 illustrates a management frame 300 that may suitably be used in practicing embodiments of the present invention. The management frame may comprise media access control (MAC) header fields frame control, duration, Address 1, SA, BSSID, and sequence control fields, with the frame control duration, and sequence control fields occupying 2 octets each and the address 1, SA, and BSSID fields occupying 6 octets each. The frame body occupies between 0 and 2312 octets, depending on design preferences, and in the present exemplary embodiment the definition reserves space for the probe request information, GAS Request, and EAP-Response Identity EAPoL information referred to above. The frame also comprises an FCS field, occupying four octets.

A client station seeking access, such as the STA 116, may send the conditional authentication management frame to an AP. The frame may be sent to an individual address, such as an address of a specific AP such as the AP 104, or a broadcast address, such as might be done by a station seeking to associate with any AP within range. Suppose that the frame is received by the AP 104. Upon receiving the frame conditional authentication management frame from, for example, the STA 116, the AP 104 invokes the client authentication module 280. Under the control of the client authentication module, the AP 104 examines the client identity present in the frame. Suitably, the client identity may be in a form such as username@realm. The access point 104 determines from the client identity if the client has a subscription to a network to which the AP 104 belongs.

If the AP 104 belongs to the network of the STA 106, the AP 104 may forward an EAPoL start message, extracted from the frame, to the network, suitably by sending the message to the AAA server 124 for client authentication. Alternatively, the AP 104 may remove any included conditions and network information request portions from the message, and forward the rest to the AAA server 124 for client authentication, thus proceeding with client authentication.

In some cases, an AP such as the AP 104 may be shared among multiple core networks. In such a case, the AP 104 may be either configured with a default home realm, or else may be configured to treat all the home realms among which it is shared as its home realm.

In the case in which the AP 104 treats all realms as its home realm, the client authentication module 280 directs the AP 104 to treat the STA 106 as being in its home realm and starts the authentication procedure by sending a request of a client, such as the STA 104, to the AAA server, such as the server 108, located in the home realm serving the client. The AAA server may, for example, send to the client an authentication response frame containing a challenge or other security parameters necessary to facilitate authentication of the client, which may be similar to an EAP-request as defined in the present 802.1x protocol. After receiving the message, the STA 106 proceeds according to the authentication mechanism of the network. The mechanism might be the 802.1x protocol or any other suitable protocol. The answer to the network information request need not be transmitted to the STA 104, because the AP 104 belongs to the home network and the client has stored or has access to any needed home network information. In one or more embodiments of the invention, an AP may be configured so as to respond to the network information request part of the original request, and such a response may suitably be accepted. The response may be used by other devices that may be passively scanning and trying to detect information from the available APs and networks.

Alternatively, if the client identity, for example, the identity information provided by the STA 104, does not match the network to which the AP 104 belongs, the AP 104 examines the response conditions set by the client. If the response conditions are met, or if no response conditions have been set by the client, the AP 104 responds to the client by sending a generic advertisement service (GAS) response or similar frame and respond to all or some of the network information requested, including information associated with the realm to which the AP 104 and the roaming partners of the AP 104 belong. In one embodiment, the client may receive a GAS response frame. When the client receives a GAS response frame, this indicates that the AP generating the response does not belong to the client's home network, but that the network met the response conditions set by the client in the request message. This response frame will list the realm the AP 102 belongs to, as well as the partners of the AP 104. The AP 104 will also include any other requested network indication. Based on the information received, the client device may choose to use this network to connect to, possibly letting the network to act as a roaming partner of its home network, accepting the roaming conditions and terms.

If the AP does not meet the response conditions, the AP does not generate a response to the client. In this case, it is possible that the client will receive no response. This lack of response may mean that no AP was available belonging to the home network of the client or no roaming partner networks were available meeting the response conditions set by the client. In this case, the client may re-send the request. If the request was sent to a broadcast address, the lack of response may indicate a transmission failure or collision, and retransmission provides for another attempt at correct delivery of the request. If the request was sent to an individual address, the client may re-send to another individual address, or re-send the request to a broadcast address instead of a unicast address.

Figure 4:
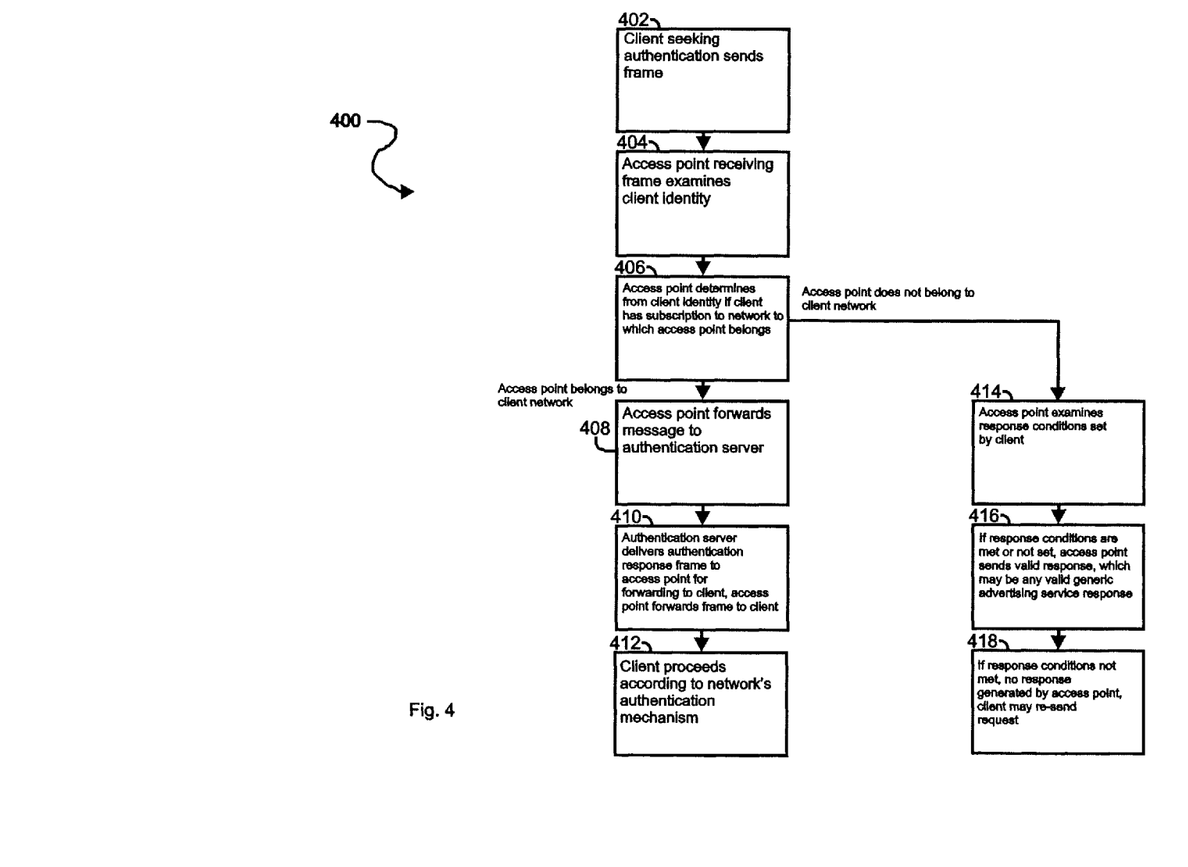
FIG. 4 illustrates a process according to an embodiment of the present invention.

FIG. 4 illustrates a process 400 of authenticating and providing access to clients according to one or more embodiments of the present invention. At step 402, a client seeking authentication sends a frame comprising information needed for scanning, network discovery, and authentication. Such information may, for example, comprise probe request information, generic advertising service information, and EAP-Response-Identity EAPoL information. The information may suitably be transmitted in a single frame, such as a physical payload data unit (PPDU) that may contain one or more management frames. The frame may be sent to an individual address or a broadcast address.

At step 404, an access point receiving the frame examines the claim for client identity information. At step 406, the access point determines from the client identity if the client has a subscription to a network to which the access point belongs. If the access point belongs to a network to which the client has a subscription, the process proceeds to step 408 and the access point forwards a start message, such as an EAPoL start message, to an authentication server, or alternatively removes any included conditions and network information from request portions from the message, and forwards the rest to the authentication server for client authentication.

At step 410, upon receiving the start message, the authentication server may deliver an authentication response frame to the access point, and the access point may then forward the authentication response frame to the client. At step 412, after receiving the message, the client proceeds according to an authentication mechanism of the network.

Returning now to step 406, if the client identity does not match a network to which the access point belongs, of if the AP is configured to respond to a request for other passive scanning devices, the process proceeds to step 414 and the access point examines the response conditions set by the client. At step 416, if the response conditions are met or, if no response conditions have been set, the access point responds to the client by sending a response associated with the realm to which the access point and the roaming partners of the access point belong. The response may, for example, comprise a GAS response frame indicating that the access point generating the response does not belong to the client's home network, but that the network met the response set by the conditions. The response frame may suitably list the realm to which the access point belongs, as well as partners of the access point and any other requested network identification. At step 418, if the response conditions are not met, no response to the client is generated by the access point, and the client may re-send the request, suitably with modified response conditions, in order to receive a response from the access point.

Embodiments of the present invention provide significant advantages. If the AP belongs to the home network of the client, approaches achieved by embodiments of the invention eliminate the need for scanning and network discovery, and if the AP is a roaming partner of the home network, approaches according to embodiments of the invention eliminate the time needed for network discovery by saving the round trip needed to convey the roaming partner list.

According to one embodiment of the invention, an apparatus comprises at least one processor and a memory storing a program of instructions. The memory storing the program of instructions is configured to, with the at least one processor, cause the apparatus to at least transmit a management frame comprising information needed for scanning, network discovery, and authentication. The apparatus further responds to an authentication response frame received from an authentication server of a network, wherein the authentication response frame is sent by the authentication server in response to a start message sent by an access point receiving the management frame from the apparatus. The response comprises following authentication procedures of the network represented by the authentication server.

According to another embodiment of the invention the authentication response frame is forwarded to the apparatus by an access point receiving the frame from the authentication server.

According to another embodiment of the invention, an apparatus comprises at least one processor and a memory storing a program of instructions. The p memory storing the program of instructions is configured to, with the at least one processor, cause the apparatus to at respond to a receiving from a client a management frame comprising information needed for scanning, network discovery, and authentication. The apparatus responds to the management frame by forwarding information contained in the management frame to an authentication server.

According to another embodiment of the invention, the apparatus further responds to the management frame by examining client identity information and forwarding the information contained in the management frame only if the client has a subscription to a network to which the access point belongs.

According to another embodiment of the invention, the apparatus receives an authentication response frame from the authentication server.

According to another embodiment of the invention, if the client does not have a subscription to a network to which the client belongs, the access point examines response conditions set by the client.

According to another embodiment of the invention, if response conditions are met or not set, the apparatus sends any valid response.

According to another embodiment of the invention, the response is a generic advertising service response.

According to another embodiment of the invention, if the apparatus receives no response from the access point, the apparatus re-sends the frame.

According to another embodiment of the invention, an apparatus comprises at least one processor and memory storing a program of instructions. The memory storing the program of instructions is configured to, with the at least one processor, cause the apparatus to at least respond to a management frame received from a client comprising information needed for scanning, network discovery, and authentication by examining the client identity to determine if the client has a subscription to a network to which the apparatus belongs and, if so, to forward a start message to an authentication server of the network.

According to another embodiment of the invention, an apparatus comprises at least one processor and memory storing a program of instructions. The memory storing the program of instructions is configured to, with the at least one processor, cause the apparatus to at least respond to a start message sent by an access point to the apparatus, wherein the start message is sent by the access point to the apparatus in response to receipt by the access point of a management frame sent by a client. The management frame comprises information needed for scanning, network discovery, and authentication. The response of the apparatus comprises sending an authentication response frame to the client.

Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

We claim:

1. An apparatus comprising:
at least one processor;
memory storing a program of instructions;
wherein the memory storing the program of instructions is configured to, with the at least one processor, cause the apparatus to at least:
control a client device to transmit to a wireless network access point a single management frame comprising information defining a signaling sequence directing scanning, network discovery, and authentication, wherein the management frame structure comprises probe request information, generic advertising service request information, and extended access protocol-response identity information;
determine whether the client has a subscription to a network from which the authentication response frame is received;
control the client device to respond to the authentication response frame sent by the access point, wherein the authentication response frame comprises authenticating information extracted from the management frame by following authentication procedures of the network, wherein the management frame provides information allowing the access point to determine the identity of the client device and to determine from the client identity if the client device has the subscription to the network, and wherein sending of the authentication response frame comprises delivery of the authentication frame to the access point by an authentication server,
wherein responding to receiving the management frame comprises examining client identity information and forwarding the information contained in the management frame only if the client has the subscription to the network to which the information contained in the management frame is to be forwarded; and
in response to determining that the client does not have the subscription to the network from which the authentication response frame is received, cause the apparatus to send a valid response, wherein the response is a generic advertisement service response.

2. The apparatus of claim 1, wherein responding to the authentication response frame comprises responding to an authentication response frame forwarded to the apparatus by the access point.

3. The apparatus of claim 1, wherein the authentication response frame is sent by an authentication server in response to a start message sent by the access point.

4. An apparatus comprising:
at least one processor;
memory storing a program of instructions;
wherein the memory storing the program of instructions is configured to, with the at least one processor, cause the apparatus to at least:
detect receiving at a wireless network access point from a client device seeking access to a network, a management frame comprising information defining a signaling sequence directing scanning, network discovery and authentication, wherein the management frame comprises probe request information, generic advertising service request information, and extended access protocol-response identity information; and
respond to receiving the management frame by forwarding information contained in the management frame to the network;
detect receiving an authentication response frame from the network, wherein the authentication response frame comprises authenticating information extracted from the management frame, by following authentication procedures of the network, wherein the management frame provides information allowing the access point to determine the identity of the client device and to determine from the client identity if the client device has a subscription to the network, and wherein sending of the authentication response frame comprises delivery of the authentication frame to the access point by an authentication server; and
in response to determining that the client does not have the subscription to the network from which the authentication response frame is received, send a valid response, wherein the response is a generic advertisement service response.

5. The apparatus of claim 4, wherein responding to receiving the management frame comprises examining client identity information and forwarding the information contained in the management frame only if the client has the subscription to the network to which the information contained in the management frame is to be forwarded.

6. A method comprising:
controlling a client device to transmit a single management frame comprising information defining a signaling sequence directing scanning, network discovery, and authentication, wherein the management frame comprises probe request information, generic advertising service request information, and extended access protocol-response identity information;
determining whether the client has a subscription to a network from which the authentication response frame is received;
responding to the authentication response frame sent by the access point, wherein the authentication response frame comprises authentication information extracted from the management frame by following authentication procedures of the network, wherein the management frame provides information allowing the access point to determine the identity of the client device and to determine from the client identity if the client device has the subscription to the network, and wherein sending of the authentication response frame comprises delivery of the authentication frame to the access point by an authentication server, wherein responding to receiving the management frame comprises examining client identity information and forwarding the information contained in the management frame only if the client has the subscription to the network to which the information contained in the management frame is to be forwarded; and
in response to determining that the client does not have the subscription to the network from which the authentication response frame is received, sending a valid response wherein the response is a generic advertisement service response.

7. The method of claim 6, wherein responding to the authentication response frame comprises responding to an authentication response frame forwarded by the access point receiving the frame from the network.

8. The method of claim 6, wherein the authentication response frame is sent by the authentication server in response to a start message sent by the access point.

9. A method comprising:
- detecting receiving at a wireless network access point from a client device seeking access to a network, a management frame comprising information defining a signaling sequence directing scanning, network discovery and authentication, wherein the management frame comprises probe request information, generic advertising service request information, and extended access protocol-response identity information; and
- responding to receiving the management frame by forwarding information contained in the management frame to a network;
- detecting receiving an authentication response frame from the network, wherein the authentication response frame comprises authenticating information extracted from the management frame, by following authentication procedures of the network, wherein the management frame provides information allowing the access point to determine the identity of the client device and to determine from the client identity if the client device has a subscription to the network, and wherein sending of the authentication response frame comprises delivery of the authentication frame to the access point by an authentication server; and
- in response to determining that the client does not have the subscription to the network from which the authentication response frame is received, sending a valid response wherein the response is a generic advertisement service response.

10. The method of claim 9, wherein responding to receiving the management frame comprises examining client identity information and forwarding the information contained in the management frame only if the client has the subscription to the network to which the information is to be forwarded.

* * * * *